United States Patent [19]
Eissner et al.

[11] Patent Number: 5,887,966
[45] Date of Patent: Mar. 30, 1999

[54] IN-GROUND LIGHTING APPARATUS AND RELATED METHOD

[75] Inventors: Jay M. Eissner, Racine; Eric J. Haugaard, Kenosha, both of Wis.

[73] Assignee: Ruud Lighting, Inc., Racine, Wis.

[21] Appl. No.: 874,134

[22] Filed: Jun. 13, 1997

[51] Int. Cl.⁶ .................................. F21V 21/26; E01F 9/00
[52] U.S. Cl. ..................... 362/153.1; 362/287; 362/419; 362/427
[58] Field of Search ................................ 362/153.1, 287, 362/418, 419, 427, 365, 245

[56] References Cited

U.S. PATENT DOCUMENTS

| | | | |
|---|---|---|---|
| 5,023,755 | 6/1991 | Rosenberg | 362/12 |
| 5,230,559 | 7/1993 | Porter et al. | 362/153.1 |
| 5,450,303 | 9/1995 | Markiewicz | 362/419 |
| 5,481,443 | 1/1996 | Wagner et al. | 362/153.1 |
| 5,655,833 | 8/1997 | Raczynski | 362/419 |

OTHER PUBLICATIONS

Excerpts from Kim Lighting Concept 5000 Product Catalog, Mar., 1990.
Excerpts from Kim Lighting CL (Compact) Concealed Landscape Luminaires, Jun. 1990.
Prescolite Outdoor Architectural Landscape Lighting Catalog, Jan., 1997.
Bronzelite/Genlyte GM–6000 Series In–Ground Landscape Lighting Catalog, Jun. 1993.

*Primary Examiner*—Thomas M. Sember
*Attorney, Agent, or Firm*—Jansson, Shupe, Bridge & Munger, Ltd.

[57] ABSTRACT

An in-ground lighting apparatus has an enclosure for placement below the surface of the earth and a lamp is mounted for adjustable positioning in the housing. In the improvement, the lamp base and lamp are supported by two pivot-mounted brackets. The brackets are spaced from the lamp rim and provide lamp-grasping clearance between them for easy re-lamping. And the brackets permit the lamp to be adjusted to direct light anywhere within a cone-shaped 360° envelope. The lamp is supported solely by its base. In a particular embodiment configured for use with HID lamps, the lamp and ballast assembly are constructed as an "integrated" unit which is easily lifted from the enclosure for service.

15 Claims, 8 Drawing Sheets

IN-GROUND LIGHTING APPARATUS AND RELATED METHOD

FIELD OF THE INVENTION

This invention relates generally to illumination and, more particularly, to lighting apparatus of the type buried in the earth and often used for landscape lighting.

BACKGROUND OF THE INVENTION

Buried lighting apparatus is often used for outdoor lighting, particularly landscape lighting. Apparatus of that type is well suited for such purposes—substantially all of the apparatus is beneath the surface of the earth and, therefore, is visually and physically unobtrusive. As to the latter characteristic, an apparatus of the in-ground type buried in a grassy area does not preclude running a lawnmower directly above it.

In general, there are two types of buried lighting apparatus, namely the "well" type and the "in-ground" type. The well type includes an elongate housing, e.g., a length of PVC pipe, extending into the earth with the top edge about in registry with the earth surface. Notably, the lamp-supporting fixture and lamp are mounted atop such housing. Such fixture and lamp are thereby exposed for easy "re-lamping" (replacing a burned-out lamp) and other maintenance.

The housing is open at the bottom and, often, a bed of gravel is placed in the lower portion of the housing and/or in the earth below the housing. The gravel facilitates water drainage.

On the other hand, in-ground lighting apparatus includes a housing that is sealed at the bottom and top, at least the latter by a removable cover. The lamp, lamp-supporting fixture, lamp-powering electrical components and the like are within the housing and the top cover includes a lens through which light projects upwardly from the housing to "uptight" trees, shrubs, building walls and the like.

While the many known embodiments of in-ground lighting apparatus have been generally satisfactory for the intended purposes, there are some characteristics which, to many, are disadvantageous. For example, some have a rigidly-mounted lamp which cannot be positioned for optimum uplighting aesthetics except by burying the housing at an angle. Of course, such buried housing cannot be easily repositioned.

Another type of known in-ground lighting apparatus mounts the lamp in such a way that it can be moved about a single pivot axis, i.e., can be moved to direct light only within a fan-shaped arc. To state it in other words, there is no opportunity for "full-circle" adjustment.

And certain known apparatus which have adjustably-mounted lamps are configured in such a way that it is difficult to grasp and replace a burned-out lamp. (This is no trivial concern. A large commercial property may have a substantial number of in-ground lighting apparatus—maintenance time and expense relating to re-lamping can be significant.)

Another characteristic of certain known in-ground lighting apparatus used with, e.g., high intensity discharge (HID) lamps involves the fact that the lamp ballast is in a housing separate from that in which the lamp is mounted. There are more components for the installer to handle and more wiring to install.

Still another disadvantage of known in-ground lighting apparatus is that they are configured to accept only a particular lamp. That is to say, there is no flexibility as to wattage and type of lamp which may be mounted in such apparatus.

Another disadvantage of some known in-ground lighting apparatus is that they are installed using "wire nuts" securing together the bare ends of two electrically-connected wires. If components need to be removed for service, the wire nuts need to be removed and the bare wire ends remaining in the enclosure taped or otherwise covered to prevent accidental contact with, e.g., the grounded enclosure.

An improved in-ground lighting apparatus and related method which addresses disadvantages of earlier in-ground lighting apparatus would be an important advance in the art.

OBJECTS OF THE INVENTION

It is an object of the invention to provide an improved in-ground lighting apparatus overcoming some of the problems and shortcomings of the prior art.

Another object of the invention is to provide an improved in-ground lighting apparatus in which the lamp is easily replaced.

Another object of the invention is to provide an improved in-ground lighting apparatus in which the lamp is positionally adjustable through 360°.

Yet another object of the invention is to provide an improved in-ground lighting apparatus configured to accept a range of lamps.

Another object of the invention is to provide an in-ground lighting apparatus which, when used with HID lamps, confines the lamp and all of the lamp-powering components in the same enclosure.

Still another object of the invention is to provide an in-ground lighting apparatus which, in certain embodiments, plug connects the lighting components to the power source. How these and other objects are accomplished will become apparent from the following descriptions and from the drawings.

SUMMARY OF THE INVENTION

The invention involves an in-ground lighting apparatus of the type having a housing for placement below the surface of the earth. A lamp is mounted for adjustable positioning in the housing and such lamp has a base, a rim and a lamp body extending between the base and the rim.

In the improvement, the base is mounted to a first U-shaped bracket extending from the base toward the rim. Such first bracket is pivot-mounted with respect to a second U-shaped bracket pivot-mounted to and extending from a fixed support member toward the rim. The bracket upper terminii are spaced from the rim to provide lamp-grasping clearance between the terminii and the rim.

In another aspect of the invention, the housing has a lens cover and extends along a housing axis which is essentially perpendicular to the lens cover. When the housing is buried in the earth, the housing axis is vertical. The first bracket pivots about a first pivot axis which is substantially perpendicular to the housing axis and the second bracket pivots about a second pivot axis which extends in the same direction as the housing axis. In a specific embodiment, the second pivot axis is substantially coincident with the housing axis.

More specifically, the second bracket includes a mount member having a lamp socket affixed to it. The base of the lamp is received in the socket and such base provides the sole support for the lamp. That is, the lamp is not further supported about its body or its rim.

The mount member is rotatably attached to a support member which is located immediately below the mount member. Rotational adjustment of the position of the lamp is by rotating the mount member with respect to the support member. To put it in other words, the relative movement of parts which occurs during rotational lamp adjustment occurs at a location below the lamp base.

In an embodiment configured for use with HID lamps, the lamp support brackets extend away from the fixed support member in a first direction. An electrical ballast assembly is attached to and extends away from the support member in a second direction opposite the first direction. The ballast assembly includes a base below the support member and such assembly is supported solely by the base. There are no support feet or the like between the base and the lamp and in a specific embodiment, the assembly is supported "free standing" on the base and is free of any fasteners or other devices securing the assembly in the housing.

Further, the lamp and the components of the ballast assembly and the lamp are arranged so that those which are more heat tolerant are above those that are less heat tolerant. In a specific embodiment, the ignitor is below the capacitor and the capacitor is below the ballast. Most preferably, the ignitor, capacitor and ballast are below the ballast and the lamp, irrespective of the relative positions of the ignitor and capacitor to one another.

Another aspect of the invention is configured for the convenience of the installer and of service personnel. The apparatus includes a terminal box and anti-siphon barrier fixed with respect to the housing. Factory-installed electrical wires extend between the terminal box and the housing and the wires include a termination in the housing. Such termination is preferably a plug disconnect, otherwise described herein as a first plug disconnect.

The ballast assembly includes a termination embodied as a second plug disconnect configured to engage the first plug disconnect. Thus, the lamp and ballast assembly can be lifted vertically upwardly out of the enclosure merely by separating the disconnects from one another. The first disconnect is a female disconnect so that no bare prongs or the like are exposed when the ballast assembly is removed. And the lens cover may be replaced to keep the inside of the housing dry while the ballast assembly is removed.

In yet another embodiment of the invention, the apparatus is configured to accept, without modification, any one of two or three lamps. In such embodiment, the support member is closely adjacent to the enclosure bottom cover and is fixed with respect to such cover. The lamp is a PAR 20 lamp and its base is received in a socket mounted to the second bracket and extending along a socket axis. When the socket axis is substantially vertical, the dimension between the socket and the lens is greater than the maximum dimension of a PAR 30 lamp measured between the base and a light-transmitting member circumscribed by the rim. Most preferably, the dimension between the socket and the lens is greater than the maximum dimension of a PAR 38 lamp measured between the base and the light-transmitting member. Thus, the apparatus will accept a PAR 20 lamp, a PAR 30 lamp or a PAR 38 lamp (listed in order of increasing length) without apparatus modification.

Further details of the invention are set forth in the following detailed descriptions and in the drawings.

DETAILED DESCRIPTION OF PREFERRED EMBODIMENTS

Figure 7:
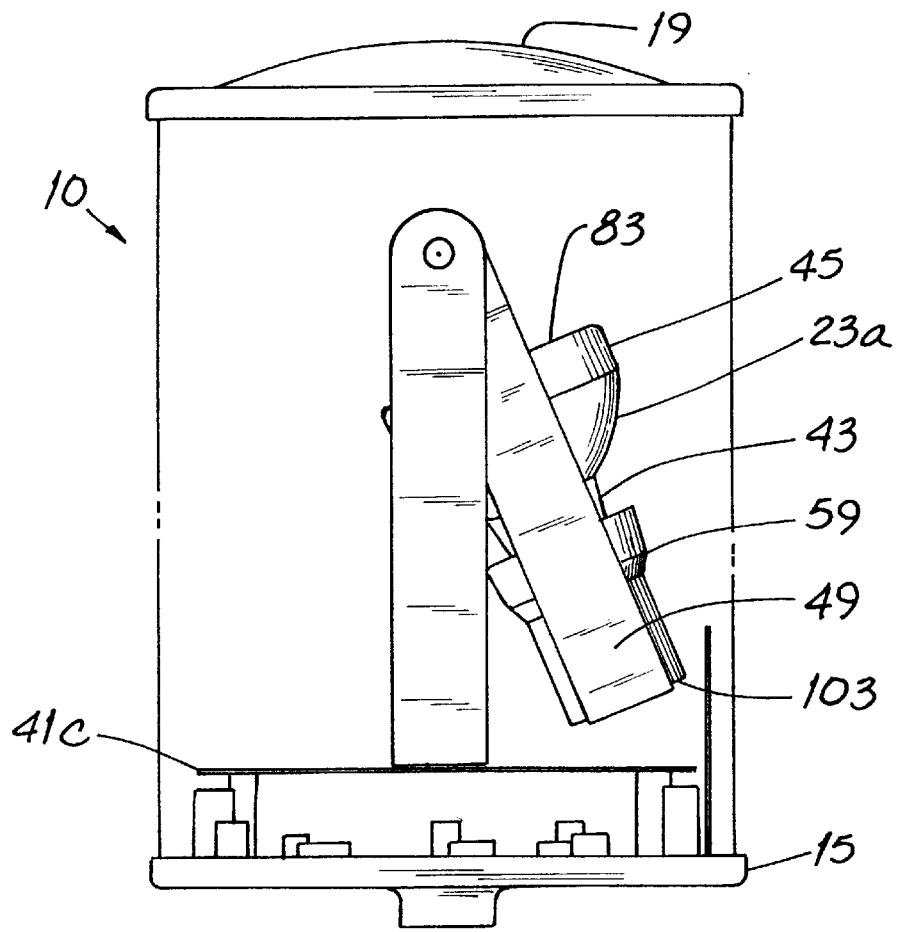
FIG. 7 is an elevation view, partly in section and with certain surfaces shown in dashed line, of an embodiment of the lighting apparatus used with line voltage lamps. A PAR 20 lamp is shown.
Figure 1:
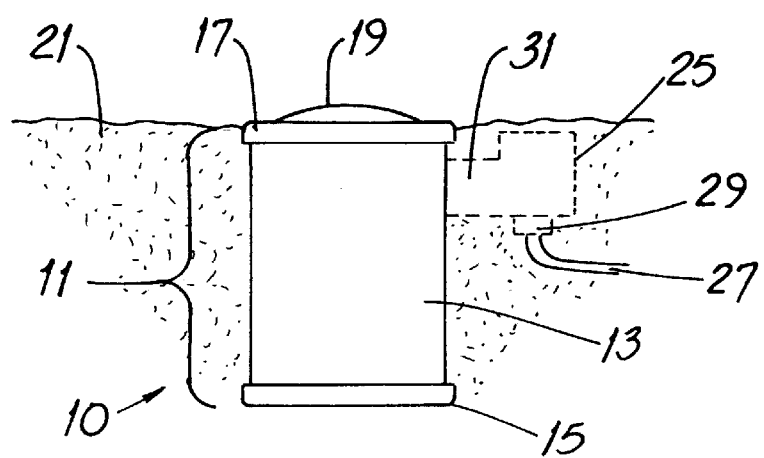
FIG. 1 is a representative elevation view, in partial section, showing the new lighting apparatus buried in the earth.
Figure 2:
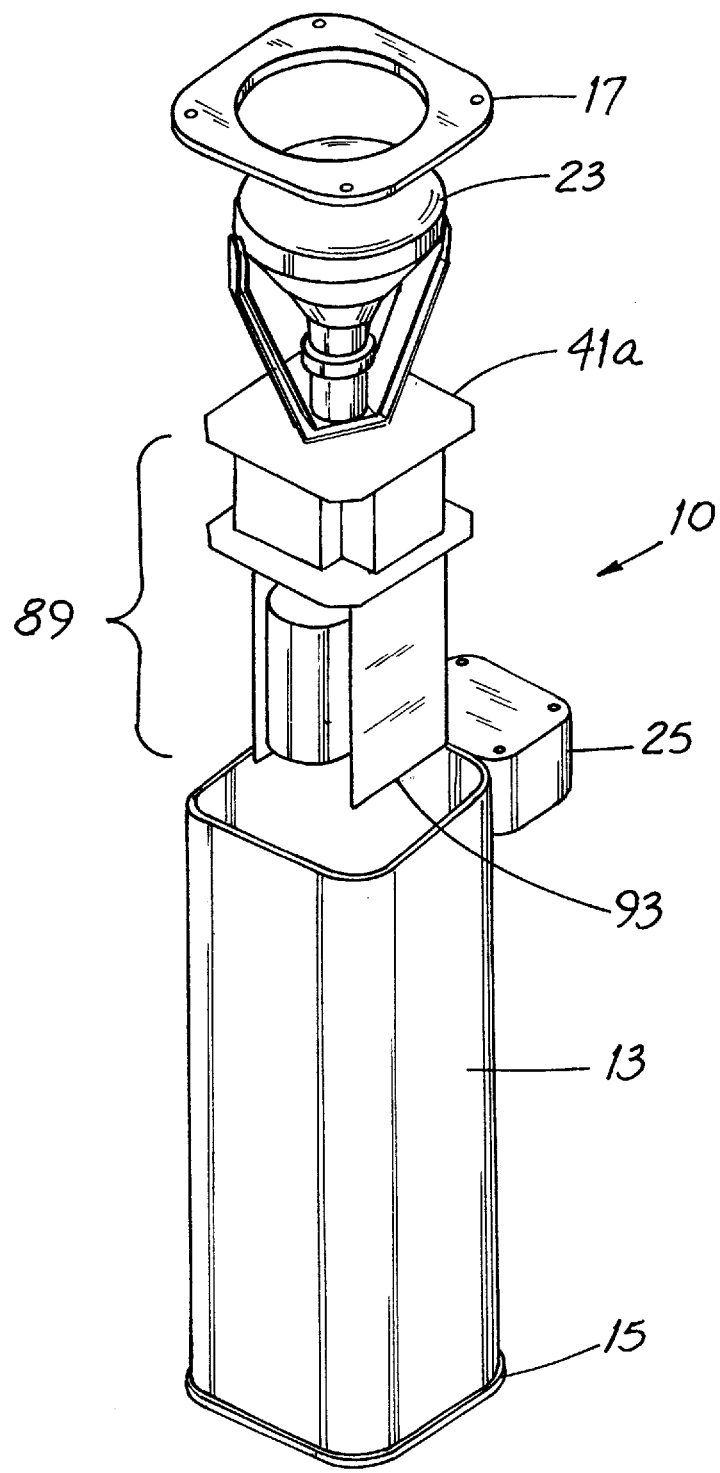
FIG. 2 is an exploded perspective view of an embodiment of the new lighting apparatus used with HID lamps.
Figure 10:
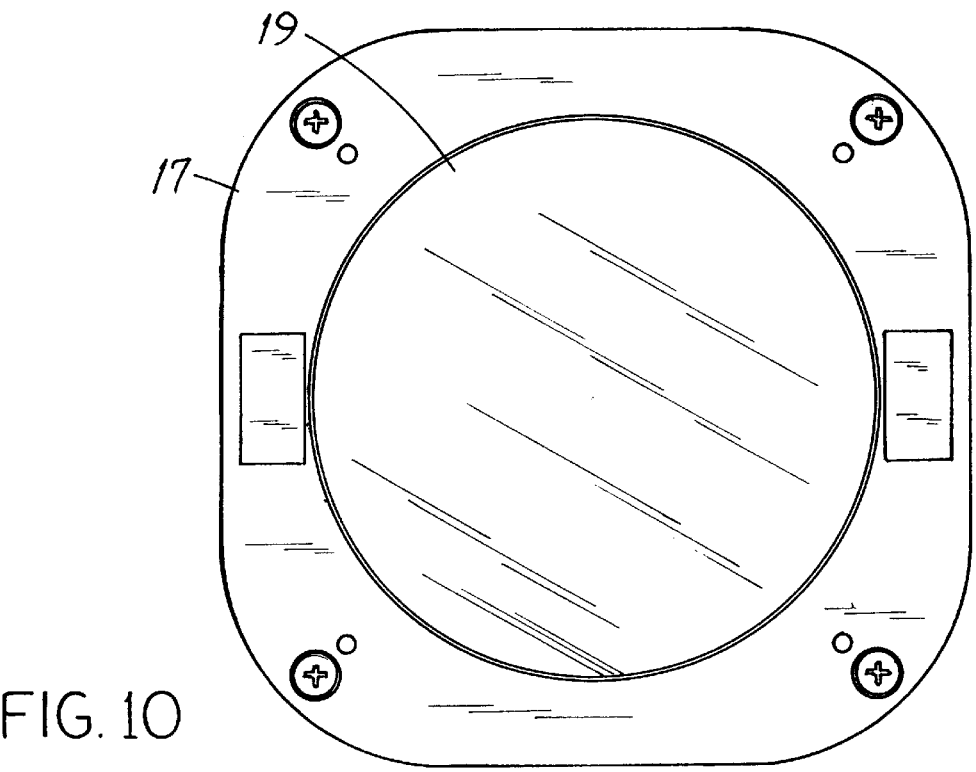
FIG. 10 is a top plan view of the top cover of the new lighting apparatus.

Before describing the new lighting apparatus 10, it will be helpful to have an understanding of how such apparatus 10 is used. Referring to FIGS. 1, 2 and 10, the apparatus 10 includes an enclosure 11 comprising a tube-like housing 13 with a gasketed bottom end cover 15 and a gasketed top cover 17 having a lens 19 mounted therein. The enclosure 11 is buried in the earth 21 so that the top cover 17 is about flush with the surface of the earth 21 and the lens 19 is exposed. A lamp 23 is in the enclosure 11 and projects light upwardly through the lens 19 to trees, shrubbery, building walls or the like.

One embodiment of the apparatus 10, described below, is used with lamps 23 operating at line voltage, e.g., 120VAC, 277VAC. Examples of such lamps 23 include incandescent, fluorescent and high intensity discharge (HID) lamps. This embodiment of the apparatus 10, sometimes referred to as the line voltage apparatus 10, includes a junction box 25 for receiving an electrical cable 27 extended into the box 25 through a conduit boss 29. An anti-siphon barrier 31 is between the box 25 and the housing 11.

Figure 3:
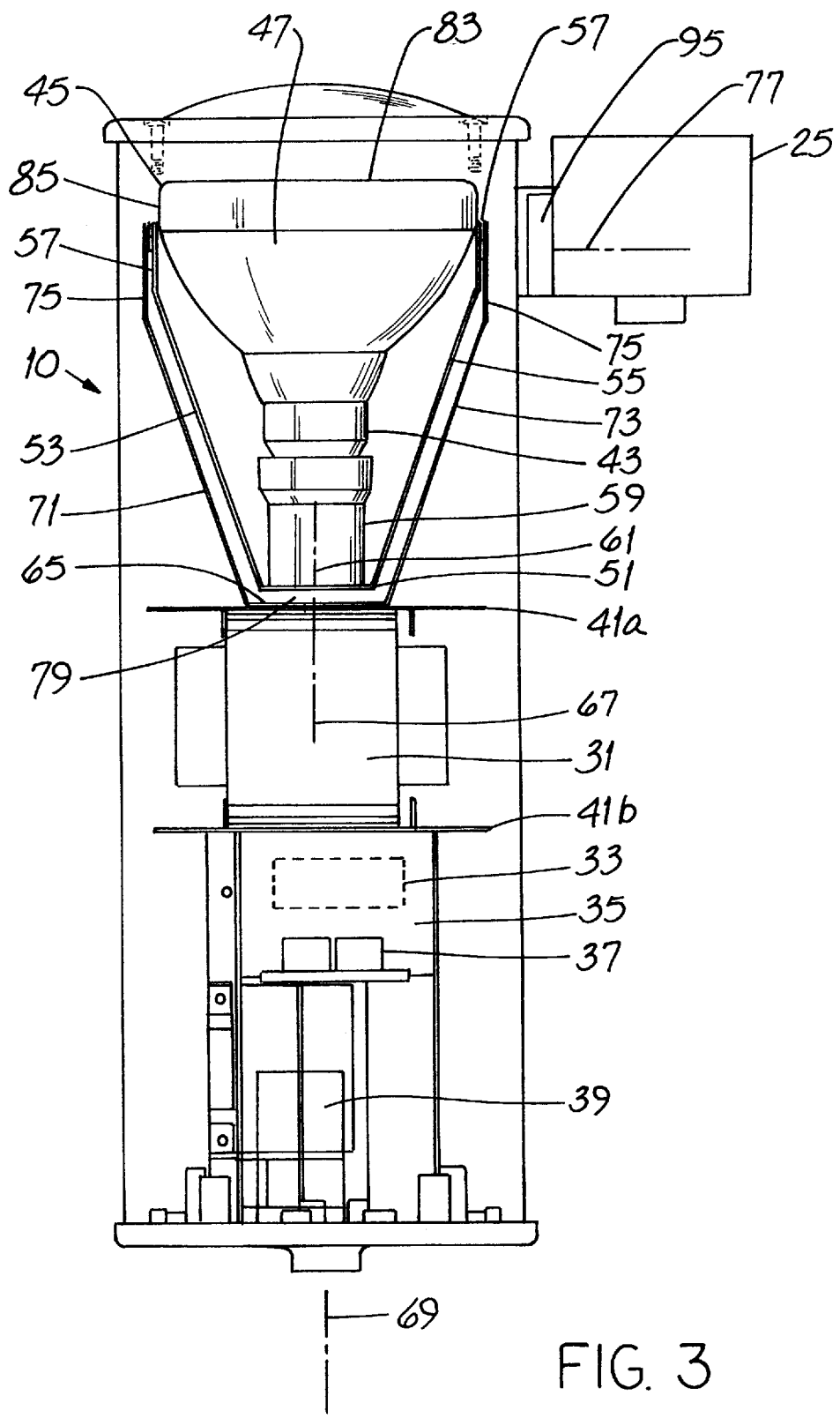
FIG. 3 is an elevation view, partly in section, of the apparatus of FIG. 2. A representation of a capacitor is shown in dashed outline.
Figure 4:
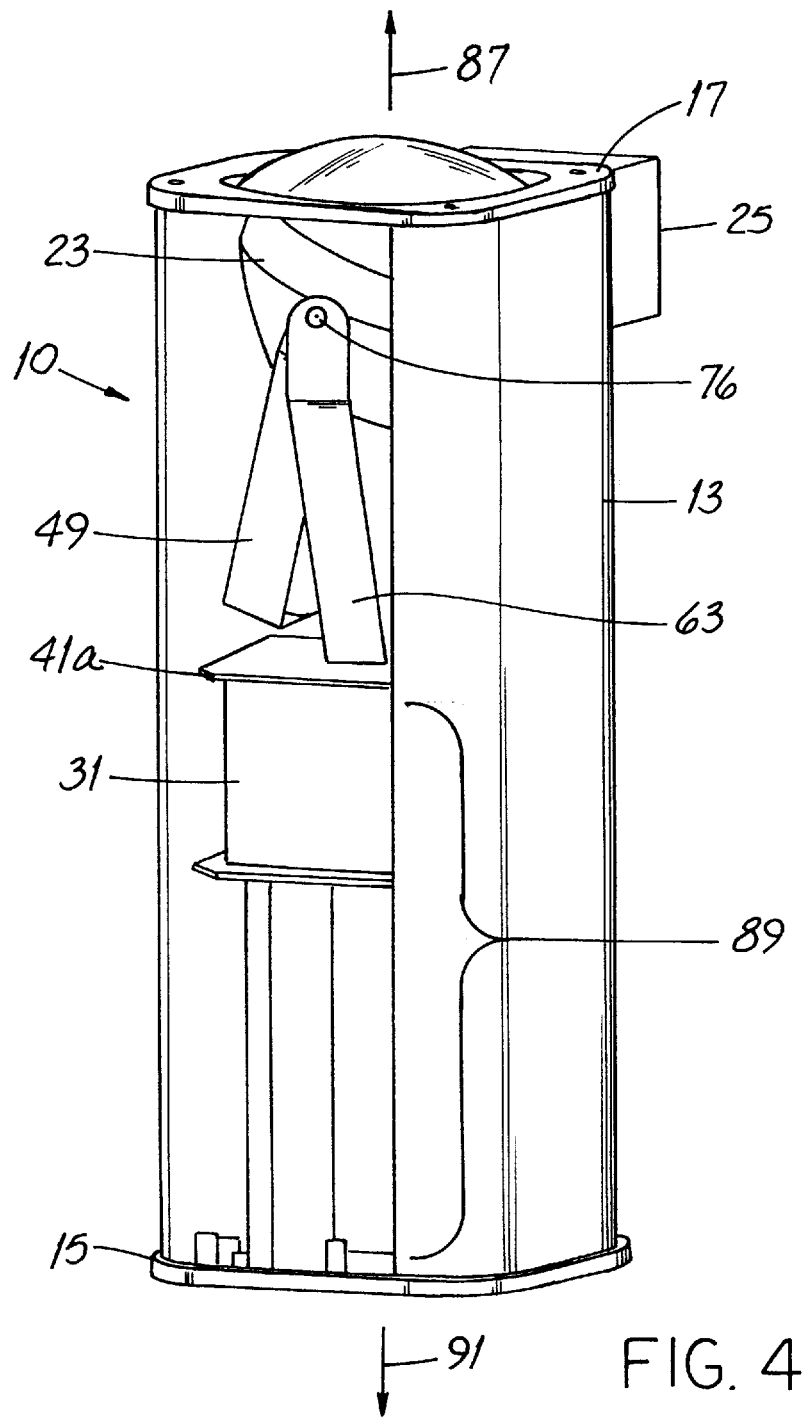
FIG. 4 is another perspective view, partly in section, of the apparatus of FIGS. 2 and 3.

Referring also to FIGS. 2, 3 and 4, a specific embodiment of the new line voltage apparatus 10 is configured for use with high intensity discharge (HID) lamps 23 which require components including a ballast 31, a capacitor 33 (behind the surface 35 and connected to terminals 37) and an ignitor 39 for starting and operating the lamp 23. A first support member 41*a*, e.g., a plate, is interposed between the ballast 31 and the lamp 23. Similarly, a second support member 41*b* is interposed between the ballast 31, which is above the member 41*b*, and the capacitor 33 and ignitor 39 which are below the member 41*b*. In a highly preferred embodiment, the members 41*a*, 41*b* are shaped to generally conform to the cross-sectional shape of the housing 13. The depicted shape is rectangular with rounded corners.

The lamp 23 in the apparatus 10 has a base 43, a rim 45 and a glass body 47 extending between the base 43 and the rim 45. The base 43 is mounted to a generally U-shaped first bracket 49 extending from the base 43 toward the rim 45 and, more specifically, is mounted to the mount member 51 of such bracket 49. A pair of arms 53, 55 extend upwardly and diverge in a direction away from the first mount member 51. Each arm 53, 55 has a generally vertical terminus 57 angled with respect to its respective arm 53 or 55. The lamp base 43 is mounted to the bracket mount member 51 by an electrical socket 59 concentric with and extending along a socket axis 61 and into which electrical leads are extended from the ballast 31, capacitor 33 and ignitor 39 below the support member 41a.

The apparatus 10 also includes a generally U-shaped second bracket 63 extending from the support member 41a toward the lamp rim 45. Such bracket 63 has a second mount member 65 pivotally attached to the support member 41a by a fastener. Measured horizontally (and when viewed left/right in FIG. 3), the length of the second mount member 65 is greater than that of the first mount member 51.

The second bracket 63 is rotatable about a second pivot axis 67 which extends in the same direction as the housing long axis 69 and which, in a specific embodiment, is coincident with such axis 69. Both axes 67, 69 are generally vertical when the enclosure is buried in the earth 21.

The second bracket 63 also has a pair of arms 71, 73 extending upwardly and diverging in a direction away from the second mount member 65. In a specific embodiment, the angle of divergence of the arms 53, 55 of the first bracket 49 and the divergence angle of the arms 71, 73 of the second bracket 63 are about equal to one another.

Each arm 71, 73 of the second bracket 63 also has a generally vertical terminus 75 angled with respect to its respective arm 71 or 73. The brackets 49, 63 are pivotally attached to one another by a pair of pins 76, each of which extends through a respective terminus 57, 75 of the first and second brackets 49, 63. The pins 76 define a first pivot axis 77 which is generally horizontal when the enclosure 11 is buried in the earth 21 and in a specific embodiment, the axes 67, 77 are perpendicular to one another.

Referring further to FIG. 3, the vertical distance from the axis 77 to the mount member 51 of the first bracket 49 is less than the vertical distance from the axis 77 to the mount member 65 of the second bracket 63 so that there is a clearance 79 between the members 51, 65. The mount member is rotatably attached to the support member located immediately below the mount member. Rotational adjustment of the lamp 23 about the axis 67 is by rotating the mount member 65 with respect to the support member 41a. That is, the relative movement of parts which occurs during rotational lamp adjustment occurs at a location below the lamp base 43.

Figure 5:
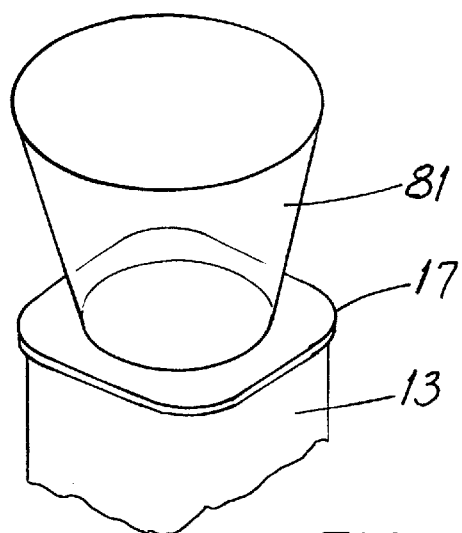
FIG. 5 is a perspective view of the lighting apparatus showing how light may be directed anywhere within a cone-shaped spatial envelope. Parts are broken away.
Figure 6:
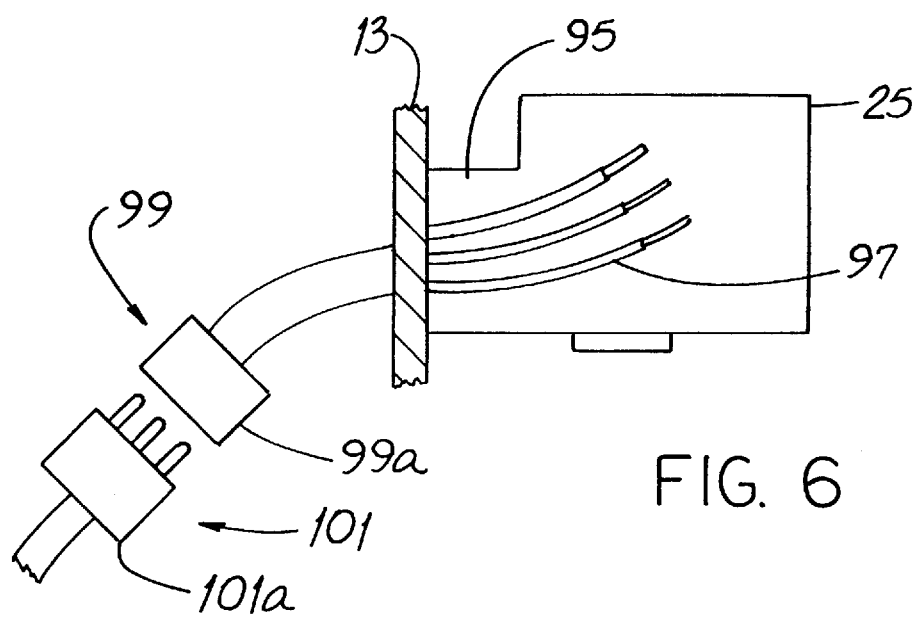
FIG. 6 is an elevation view, partly in section, showing the apparatus junction box and wiring terminations.
Figure 8:
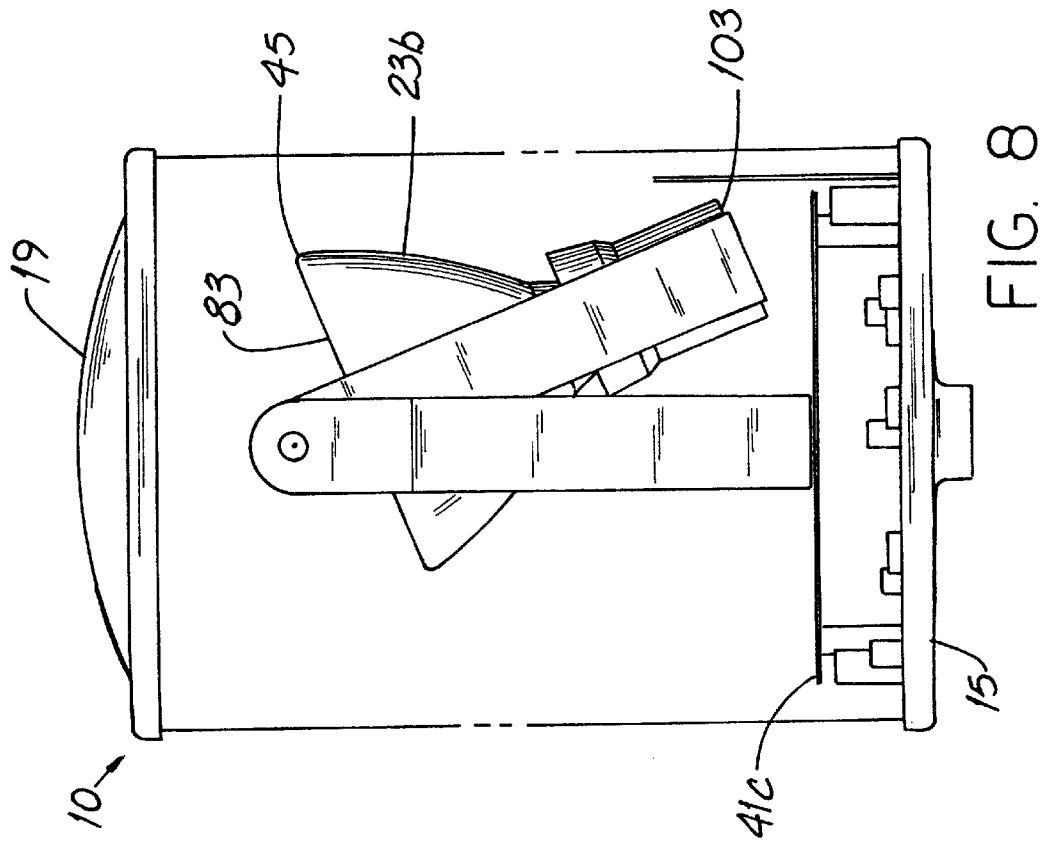
FIG. 8 is an elevation view like that of FIG. 7 and showing a PAR 30 lamp.
Figure 9:
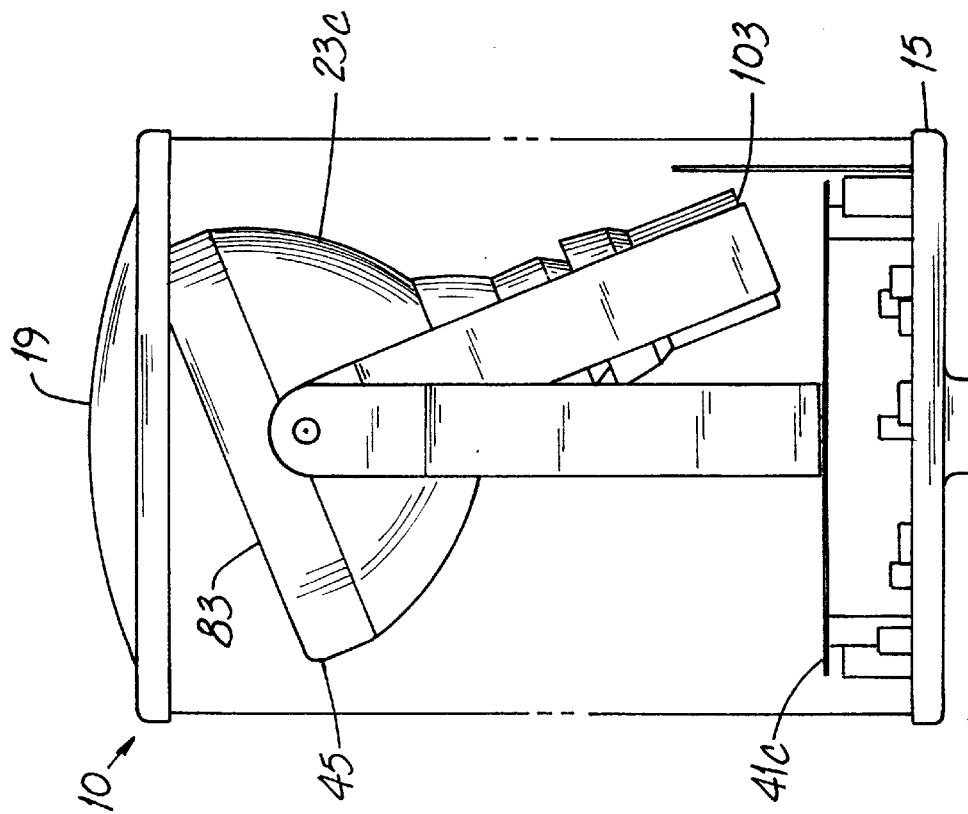
FIG. 9 is an elevation view like that of FIG. 7 and showing a PAR 38 lamp.

Because the lamp 23 is mounted for movement in either or both of two axes 67, 77, the lamp 23 can be adjusted to emit light anywhere in a cone-shaped spatial envelope 81 as shown in FIG. 5. And the bracket upper terminii 57, 75 are spaced downwardly along the rim 45 and away from the light-transmitting member 83 circumscribed by the rim 45. This configuration exposes the lamp-grasping surface 85 between the terminii 57, 75 and the member 83.

Referring further to FIGS. 2, 3 and 4, in an apparatus 10 configured for use with high intensity discharge (HID) lamps, the support member 41a is, vertically, about midway between the covers 15, 17 and the lamp support brackets 49, 63 extend away from the fixed support member 41a in a first direction represented by the arrow 87. An electrical ballast assembly 89 is attached to and extends away from the support member 41a in a second direction opposite the first direction and represented by the arrow 91.

The ballast assembly 89 includes a base below the support member 41a and such assembly 89 is supported solely by the base 93 resting on the bottom cover 15. There are no support feet or the like between the base 93 and the lamp 23 and in a specific embodiment, the assembly 89 is supported "free standing" on the base 93 and is free of any fasteners or other devices securing the assembly 89 in the enclosure 11. Thus, when the top cover 17 is removed, the ballast assembly 89 and associated lamp 23 and lamp hardware can be lifted vertically upwardly as a unit without removing any mounting fasteners. And the top cover 17 can be replaced to exclude water from the housing 13.

Further, the lamp 23 and the components of the ballast assembly 89 are arranged so that those which are more heat tolerant are above those that are less heat tolerant. In a specific exemplary embodiment, the ignitor 39 is below the capacitor 33 and the capacitor 33 is below the ballast 31. And the ignitor 39, capacitor 33 and ballast 31 are below the lamp 23. More generally, a preferred embodiment includes the ignitor 39 and capacitor 33 below the ballast 31, irrespective of the relative positions of the ignitor 39 and capacitor 33 to one another.

Another aspect of the invention is configured for the convenience of the installer and of service personnel. Referring to FIGS. 2, 3, 4 and 6, the apparatus 10 includes a junction box 25 and anti-siphon barrier 95 fixed with respect to the housing 13. Factory-installed electrical wires 97 extend between the junction box 25 and the housing 13 and the wires 97 include a termination 99 in the housing 13. Such termination 99 is preferably a plug disconnect 99a, otherwise described herein as a first plug disconnect 99a.

The ballast assembly 89 has connected thereto a termination 101 embodied as a second plug disconnect 101a configured to engage the first plug disconnect 99a. Thus, the lamp 23 and ballast assembly 89 can be lifted vertically upwardly out of the enclosure merely by separating the disconnects 99a, 101a from one another. The first disconnect 99a is a female disconnect so that no bare prongs or the like are exposed when the ballast assembly 89 is removed.

Referring now to FIGS. 3, 7, 8 and 9 in yet another embodiment of the invention, the apparatus 10 is configured to accept, without modification, any one of two or three lamps 23a, 23b, 23c. In such embodiment, the support member 41c (preferably an elongate, flat strap) is closely adjacent to the enclosure bottom cover 15 and is fixed with respect to such cover 15. The lamp 23a is a PAR 20 lamp and its base 43 is received in a socket 59 mounted to the first bracket 49 and extending along the socket axis 61. The distance between the socket end panel 103 and the lens 19 is greater than the maximum dimension of a PAR 30 lamp 23b measured between the tip of the base 43 and the light-transmitting member 83 circumscribed by the rim 45. Most preferably, the distance between the socket panel 103 and the lens 19 is greater than the maximum dimension of a PAR 38 lamp measured between the tip of the base 43 and the light-transmitting member 83. Thus, the apparatus 10 will accept a PAR 20 lamp 23a, a PAR 30 lamp 23b or a PAR 38 lamp 23c (listed in order of increasing length) without apparatus modification. The lamps 23a, 23b and 23c are all incandescent lamps operating at line voltage, e.g., 120VAC.

Figure 12:
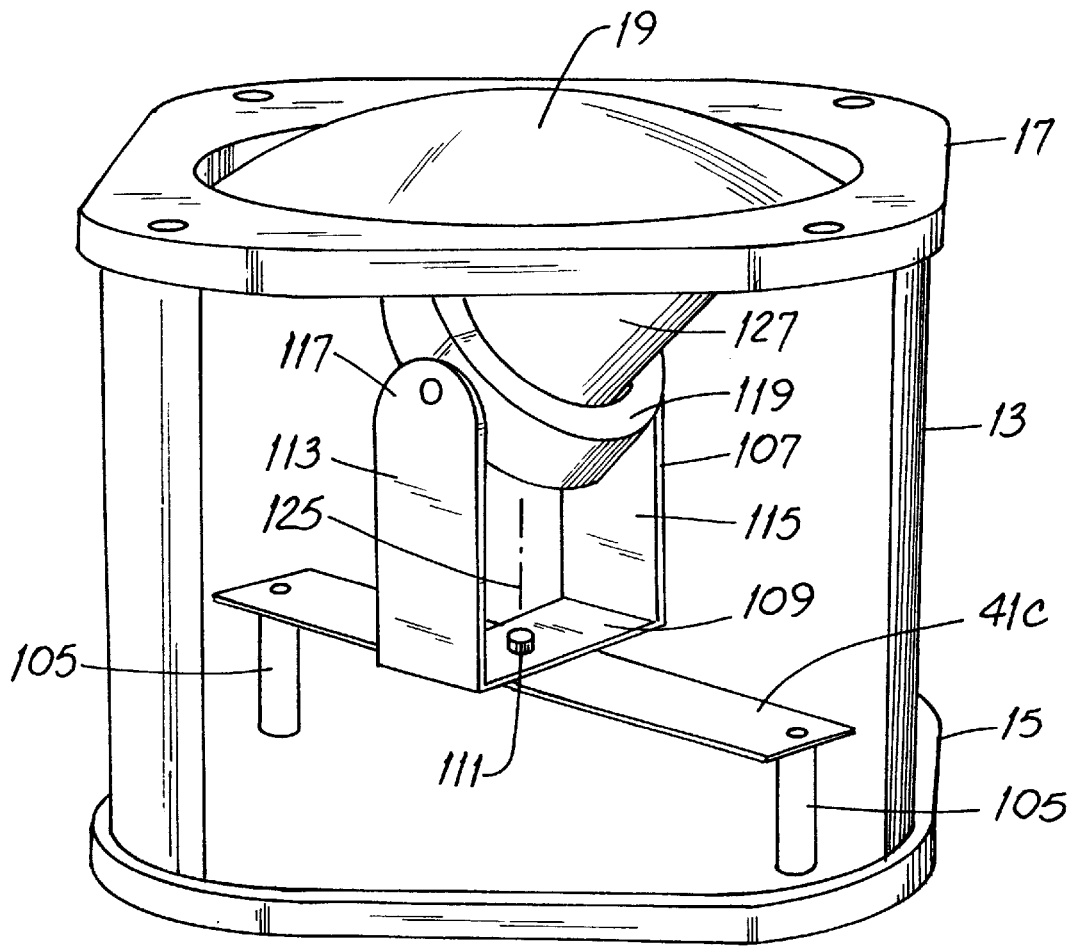
FIG. 12 is a perspective view, partly in section, of the embodiment of the apparatus of FIG. 11.
Figure 11:
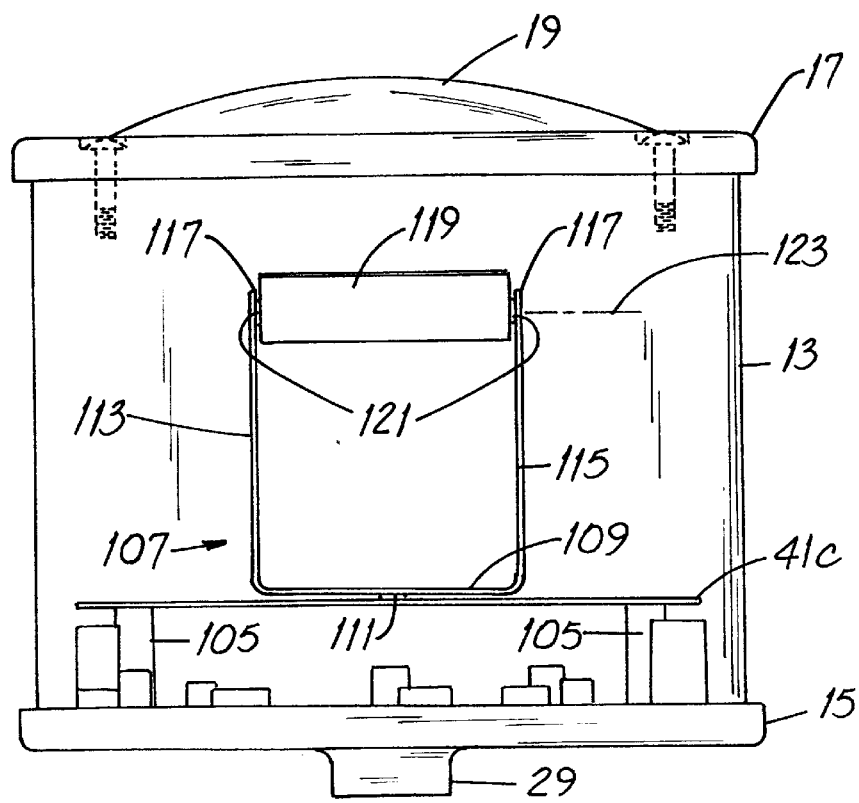
FIG. 11 is an elevation view, partly in section, of an embodiment of the lighting apparatus used with low voltage lamps.

Referring next to FIGS. 11 and 12, another embodiment of the apparatus 10 is configured for low voltage, e.g., 12VAC, lamps 23 such as MR16 or PAR36 lamps. The apparatus 10 includes a strap-type support member 41c mounted atop and affixed to standoff studs 105 which are fixed with respect to the bottom end cover 15. A generally U-shaped bracket 107 has its mount member 109 pivotally attached to the bracket 107 by a pin 111. Bracket arms 113, 115 extend upwardly from the mount member 109 and the terminus 117 of each arm 113, 115 is pivotally attached to a circular lamp mounting ring 119 by pins 121.

The pins 121 are coincident with a ring pivot axis 123 and in a specific embodiment, the axis 123 and the bracket pivot axis 125 are perpendicular to one another. A lamp 23 secured in the ring 119 may thereby be positioned in either or both of two axes of movement to provide light anywhere in a cone-shaped spatial envelope 81 as shown in FIG. 5. When mounted on the ring 119, an optional shroud 127 results in a light beam which is generally cylindrically-shaped rather than cone-shaped.

While the principles of the invention have been shown and described in connection with a few preferred embodiments, it is to be understood clearly that such embodiments are by way of example and are not limiting.

What is claimed:

1. In an in-ground lighting apparatus having an enclosure for placement below the surface of the earth and including a lamp receivable within the enclosure and mounted therein for adjustable positioning, such lamp having a base, a rim, a light-transmitting member circumscribed by the rim, and a lamp body extending between the base and the rim, the improvement wherein:

the base of the lamp is mounted to a first bracket receivable in the enclosure and extending from the base toward the rim of the lamp;

the first bracket is pivot-mounted with respect to a second bracket receivable within the enclosure and extending from a support member toward the rim of the lamp; and the brackets are spaced from the light-transmitting member, thereby exposing a lamp-grasping surface between the brackets and the light-transmitting member.

2. The apparatus of claim 1 wherein:

the enclosure has a lens cover and extends along an enclosure axis substantially normal to the lens cover; and the first bracket pivots about a first pivot axis which is substantially perpendicular to the enclosure axis.

3. The apparatus of claim 2 wherein:

the second bracket is pivot-mounted with respect to the support member; and the second bracket pivots about a second pivot axis which is substantially coincident with the enclosure axis.

4. The apparatus of claim 1 wherein the second bracket is pivot-mounted with respect to the support member.

5. The apparatus of claim 4 wherein:

the enclosure has a lens cover and extends along an enclosure axis substantially normal to the lens cover; and the second bracket pivots about a second pivot axis which extends in the same direction as the enclosure axis.

6. The apparatus of claim 1 wherein:

the enclosure has a bottom cover and a top cover with a lens mounted thereon;

the support member is fixed with respect to the bottom cover;

the lamp is a PAR 20 lamp and its base is received in a socket mounted to the first bracket and extending along a socket axis; and when the socket axis is substantially vertical, the dimension between the socket and the lens is greater than a maximum dimension of a PAR 30 lamp measured between the base and a light-transmitting member circumscribed by the rim.

7. The apparatus of claim 6 wherein the dimension between the socket and the lens is greater than a maximum dimension of a PAR 38 lamp measured between the base and the light-transmitting member.

8. In an in-ground lighting apparatus having an enclosure for placement below the surface of the earth and including a lamp receivable within the enclosure and mounted therein for adjustable positioning, such lamp having a base, a rim and a lamp body extending between the base and the rim, the improvement wherein:

the base of the lamp is mounted to a first bracket extending from the base toward the rim of the lamp;

the first bracket is pivot-mounted with respect to a second bracket extending from a support member toward the rim at a location adjacent the lamp body;

the first bracket includes a mount member having a lamp socket affixed thereto; and the base of the lame is received in the socket, thereby providing the sole support for the lamp.

9. The apparatus of claim 8 wherein:

the second bracket includes a second mount member, the second mount member rotatably attached to the support member below the first mount member; and rotational adjustment of a position of the lamp is by rotating the second mount member with respect to the support member.

10. In an in-ground lighting apparatus having an enclosure for placement below the surface of the earth and including a lamp mounted for adjustable positioning in the enclosure, such lamp having a base, a rim and a lamp body extending between the base and the rim, the improvement wherein:

the base is mounted to a first bracket extending from the base toward the rim;

the first bracket is pivot-mounted with respect to a second bracket extending from a support member toward the rim;

the first bracket includes a mount member having a lamp socket affixed thereto;

the lamp base is received in the socket, thereby providing the sole support for the lamp; wherein the lamp is a high intensity discharge lamp and:

the brackets extend away from the support member in a first direction;

the apparatus includes an electrical ballast assembly extending away from the support member in a second direction opposite the first direction;

the ballast assembly includes a base below the support member; and the ballast assembly is supported solely by the base thereof.

11. The apparatus of claim 10 wherein:

the ballast assembly includes a ballast, a capacitor and an ignitor;

the ignitor is below the capacitor and the capacitor is below the ballast.

12. The apparatus of claim 10 including a terminal box and anti-siphon barrier fixed with respect to the housing and wherein:

electrical wires extend between the terminal box and the housing;

the wires include a termination in the housing; and such termination includes a first plug disconnect.

13. The apparatus of claim 12 wherein the ballast assembly includes a termination embodied as a second plug disconnect configured to engage the first plug disconnect.

14. An in-ground lighting device for illuminating an area with a lamp, the lamp receivable within the lamp-receiving cavity in the enclosure, the lamp having a base, a rim, a light-transmitting member circumscribed by the rim, and a lamp body extending between the base and the rim, the device comprising:

an enclosure extending along a longitudinal axis and defining a lamp-receiving cavity therein for receiving the lamp;

a first bracket positioned in the lamp-receiving cavity of the enclosure and having first and second arms extending from the base of the lamp toward the rim of the lamp so as to define a lamp grasping area therebetween;

a light socket mounted to the first bracket for receiving the base of the lamp therein;

a second bracket positioned in the lamp-receiving cavity of the enclosure and having an arm extending from the base of the lamp toward the rim of the lamp;

a first connection structure for pivotably interconnecting the first arm of the first bracket and the arm of the second bracket at a location adjacent the lamp body;

a support member positioned in the lamb-receiving cavity in the enclosure for supporting the second bracket; and a mount member for pivotably mounting the second bracket to the support member for rotational movement about the longitudinal axis.

15. The device of claim 14 further comprising a lens cover interconnected to the enclosure over the lamp-receiving cavity, the lens cover generally perpendicular to the longitudinal axis of the enclosure.

* * * * *

UNITED STATES PATENT AND TRADEMARK OFFICE
CERTIFICATE OF CORRECTION

PATENT NO. : 5,887,966
DATED : March 30, 1999
INVENTOR(S) : Jay M. Eissner et al It is certified that error appears in the above-identified patent and that said Letters Patent are hereby corrected as shown below:

In Fig. 3, cancel "83" and substitute therefor - -23- -;
In Col. 2, line 54, cancel "terminii" and substitute therefor - -termini- -;
In Col. 2, line 55, cancel "terminii" and substitute therefor - -termini- -;
In Col. 4, line 50, cancel "31" and substitute therefor - -95- -;
In Col. 5, line 53, cancel "in" and substitute therefor - -about- -;
In Col. 5, line 54, cancel "terminii" and substitute therefor - - termini- -; and
Claim 6, Col. 8, line 24, cancel "lame" and substitute therefor - -lamp- -.

Signed and Sealed this

Twenty-first Day of September, 1999

Attest:

Q. TODD DICKINSON

*Attesting Officer*　　　*Acting Commissioner of Patents and Trademarks*